United States Patent [19]

Roebuck et al.

[11] 4,215,853
[45] Aug. 5, 1980

[54] STIRRING MEANS

[75] Inventors: Peter Roebuck; James H. T. Petch, both of Manchester, England

[73] Assignee: Magnesium Elektron Limited, United Kingdom

[21] Appl. No.: 967,331

[22] Filed: Dec. 7, 1978

Related U.S. Application Data

[62] Division of Ser. No. 842,014, Oct. 13, 1977, Pat. No. 4,169,888.

[51] Int. Cl.² .............................................. C22B 9/00
[52] U.S. Cl. .................................... 266/235; 366/288
[58] Field of Search .................... 75/61; 266/233, 235; 366/287, 288

[56] References Cited
FOREIGN PATENT DOCUMENTS
1049818  2/1959  Fed. Rep. of Germany ........... 366/288

Primary Examiner—M. J. Andrews
Attorney, Agent, or Firm—Karl W. Flocks

[57] ABSTRACT

Fluid masses comprising molten metal, such as magnesium alloys, are stirred using a loop-shaped paddle rotating about an axis which itself rotates orbitally about a fixed axis, the loop being shaped so that it passes close to substantially the whole of the bottom of the vessel.

7 Claims, 1 Drawing Figure

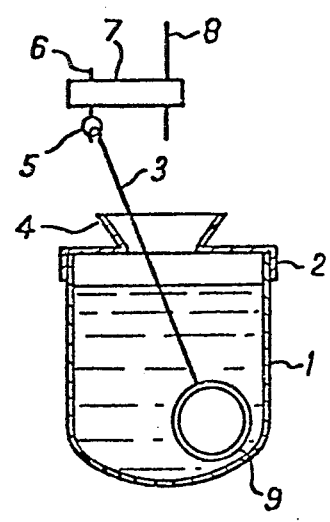

STIRRING MEANS

This is a Division of application Ser. No. 842,014, filed Oct. 13, 1977 now U.S. Pat. No. 4,169,888.

This invention relates to stirring apparatus and to the use of such apparatus for stirring material comprising molten metal such as molten metal alloys.

Metal alloys generally contain constituents having different densities and different melting points and when they are made it is frequently necessary to stir molten metal to obtain a uniform melt. For example when magnesium alloys containing denser metals such as zirconium are made molten magnesium is mixed with a hardener alloy containing zirconium and magnesium and as the hardener has a higher density it tends to settle at the bottom of the vessel containing the melt. Considerable stirring is then required to achieve a uniform alloy.

Hitherto such stirring has usually been carried out by a technique known as "puddling" in which the melt is stirred manually with a long rod. This process is strenuous, unpleasant and sometimes dangerous for the operator when large batches of molten material are to be handled.

Manual stirring is also unsatisfactory when the duration and intensity of stirring is critical. For example, when zirconium is being added to molten magnesium in an iron or steel vessel the zirconium tends to be precipitated by iron pickup from the vessel wall so that prolonged stirring gives a low zirconium content in the finished alloy. Manual puddling then requires considerable skill to achieve consistently good results.

Similar problems arise when mixtures of molten metal with other materials are to be stirred. For example a hardener alloy containing magnesium and a high proportion of zirconium may be made by causing excess molten magnesium to react with a zirconium halide (fluoride or chloride) to give the corresponding magnesium halide and zirconium metal which forms an alloy with the unreacted magnesium. Stirring is normally required during the reaction itself and also for a period after the reaction has finished both to ensure uniform mixing of the magnesium and zirconium (which has a higher density than magnesium and accordingly tends to sink to the bottom of the vessel) and to allow separation by floatation of the magnesium halide from the alloy. Manual puddling is unpleasant during the reaction stage because of the generation of halide fumes. When the reaction has finished the melt has a high viscosity, requiring intense agitation to allow the halide to separate, so that very laborious puddling is required.

Attempts have been made to stir melts mechanically using simple uni-directional paddle stirrers which are rotated by a motor. It has been found that such stirrers require high power give a low degree of shearing of the melt with correspondingly poor mixing action and create a strong vortex.

Attempts have also been made to stir such melts with a vibrating device and with a rotating Archimedean screw. It has been found that a large vibrating device tends to move the melt on bloc, with little effective stirring, and a small vibrating device has only a very localised effect. An Archimedean screw tended to produce liquation in a magnesium alloy, producing undesired separation of the metal constituents of the alloy.

The present invention is intended to provide a means of stirring which may be power-driven and gives efficient stirring with more easily reproducible results than manual stirring.

According to one aspect of the invention there is provided apparatus for stirring a fluid mass comprising molten metal which comprises a refractory vessel to contain the molten mass, a refractory loop-shaped paddle to be immersed in the mass and means for rotating the paddle about an axis which is itself orbitally rotatable about a fixed axis, the loop being shaped so that during rotation it can pass close to substantially the whole of the bottom of the vessel.

According to another aspect of the invention, there is provided a method of stirring a fluid mass comprising molten metal contained in a vessel, the method comprising rotating a loop-shaped paddle in the mass about an axis which itself orbitally rotates about a fixed axis, the shape of the loop being such that it passes close to substantially the whole of the bottom of the vessel.

The paddle may be of circular, oval or any other loop shape. It has been found that a loop, which has a relatively small cross-sectional area enclosing a large free area, gives much better results than a paddle formed of a solid blade and requires far less power for rotation. It is believed that the effective degree of shear with a loop is far greater than that obtained with a solid blade. Typically, the material of the loop may be about 12 mm thick. The loop may be closed or may have a gap provided that a relatively large area is still effectively enclosed.

The loop should be shaped, in relation to the bottom of the vessel, so that during rotation it may pass close (i.e. within a few millimeters) to substantially the whole of the bottom. This ensures that substantially all the material in the bottom of the vessel, including material of higher density which may have settled out of the fluid mass and would otherwise remain unaffected on the bottom, is dispersed in the mass. The bottom of the vessel is preferably curved and may be hemispherical so that it is readily swept by the loop.

In an advantageous embodiment the loop is connected to an upwardly projecting rod defining its axis of rotation and the rod is connected to drive means by a flexible coupling, which may be a simple hook and eye. The drive means is itself drivable about the fixed axis. Using this arrangement, when the loop is rotated in the fluid and the drive means is rotated about the fixed axis the rod assumes a position forming an angle with the fixed axis and the loop precesses about the fixed axis, passing close to the wall of the vessel as well as the bottom.

The loop may with advantage be raised or lowered during stirring; this may be effected in a simple manner by raising or lowering the drive means. Substantially the whole of the contents of the vessel are then traversed by the rotating loop, giving very efficient mixing.

Provision may be made to rotate the loop in either sense relative to the orbital rotation about the fixed axis. The desired direction of rotation depends on the nature of the stirring to be effected. If the loop rotates about its axis in the same sense as its rotation about the fixed axis vigorous stirring is obtained, with a particularly high degree of shear near the wall of the vessel and the fluid in the vessel is violently agitated with formation of a vortex.

If the loop rotates about its axis in the sense reverse to that of the rotation about the fixed axis a much more gentle stirring is obtained near the wall and vortexes are much less likely to be formed.

It has been found that the latter mode of stirring is especially beneficial when it is desired to separate components having different densities from a viscous fluid mixture. It is believed that in a viscous fluid mixture voids are constantly created behind the loop as it rotates and these voids collapse relatively slowly, enabling the constituents of the mixture to separate. If the loop is raised through the mixture during this operation a high proportion of the lighter constituent is brought to the surface with the loop and may easily be removed.

The avoidance of vortexes with this mode of stirring is especially useful when the molten material has to be protected from oxidation, as is the case of magnesium alloys which require a protective atmosphere.

The loop and the vessel interior may be of any refractory material which can withstand the temperature and corrosive effect of the molten mass. The temperature of a mass containing a molten metal may be anywhere from 300° C. to 2000° C. depending on the nature of the molten constituents. For magnesium alloys the loop and vessel may generally be made of mild steel.

An embodiment of stirring apparatus according to the invention will be described by way of example with reference to the accompanying drawing which is a vertical section of a vessel for containing molten metal provided with a stirrer.

Referring to the drawing, a circular steel vessel 1 has a curved bottom and is provided with a removable cover 2 having a flange fitting around the rim of the vessel. Cover 2 has a central hole through which the stirrer rod 3 of approximately 12 mm steel bar may pass and the hole has an upwardly extending flared flange 4.

The rod 3 is provided at its lower end with a loop 9 of approximately 12 mm steel bar shaped so that as the rod 3 precesses the edge of the loop sweeps substantially the whole lower inside surface of the vessel.

The upper end of the rod 3 has a hook which may be inserted in a ring 5 which is mounted on a rotatable spindle 6. Spindle 6 is mounted on an arm 7 which is itself mounted to rotate about a fixed vertical shaft 8. The axis of shaft 8 coincides with the vertical axis of symmetry of the vessel 1.

A motor and train of gears of conventional type, not shown in the drawing, are provided to rotate the arm 7 about shaft 8 while the spindle 6 is rotated simultaneously. Shaft 8 and spindle 6 are connected by a gearbox mounted on arm 7 such that their relative rates of rotation may be set at different ratios and the spindle 6 may be rotated in either sense relative to rotation of the arm about shaft 8.

The shaft 8 and arm 7 may be raised and lowered during stirring, for example by means of a hydraulic lifting device, not shown in the drawing. The loop 9 may thus be caused to traverse all the material contained in the vessel.

When the apparatus is used for mixing alloy constituents the solid and molten constituents may be fed to the vessel, the rod 3 is inserted, the cover 2 mounted in place, the rod 3 connected to hook 5 and the stirrer rotated at the desired speed for the time required. The molten material in the vessel may be covered with a layer of protective material, for example in the case of molten magnesium a flux, sulphur dioxide or sulphur hexafluoride. The protective material may be introduced into the vessel through the orifice in the cover, the flange 4 directing its flow.

As the loop sweeps most of the lower surface of the vessel any solid or liquid constituents which are heavier than the rest of the vessel's contents and which would otherwise remain at the bottom are efficiently dispersed throughout the liquid. A high degree of shearing, giving efficient mixing, is also obtained throughout the liquid. When the sense of the loop's rotation about the rod is reverse to the orbital rotation about the shaft any vortex generated is very slight so that the surface of the liquid is not disturbed to any marked extent, thus minimizing atmospheric oxidation of the molten material.

The use of this apparatus for mixing alloys will be illustrated by the following Example 1.

EXAMPLE 1

20 kg of magnesium was melted in the vessel of FIG. 1 and 0.8 kg of a hardener alloy consisting of magnesium with approximately ⅓ of its weight zirconium to refine the grain size to not more than 0.03 mm. The melt was stirred using a stirrer as shown in the drawing with the arm rotating at 60 rpm about shaft 8 and the loop rotating at 80 rpm about the axis of rod 3 in the opposite sense to that of the arm's rotation. The loop remained immersed in the melt.

For comparison the same constituents were melted together and puddled manually.

Examples of the melts were taken at intervals during stirring, cast and their grain size determined by a standard method. The results are shown in the following Table.

TABLE

| | LOOP STIRRER | | | | | | |
|---|---|---|---|---|---|---|---|
| Duration of stirring (min) | 0 | ½ | 1 | 2 | 3 | 5 | 7 |
| Grain size mm | .065 | .017 | .029 | .028 | .030 | .032 | .036 |
| | HAND PUDDLER | | | | | | |
| Duration of stirring (min) | 0 | ½ | 1 | 2 | 3 | 5 | 7 |
| Grain size mm | .065 | .030 | .030 | .024 | .030 | .035 | .042 |

It will be seen from these results that with the rotating loop the minimum grain size was achieved after 30 seconds as against 2 minutes with hand puddling, the minimum size achieved was smaller and the rate of grain coarsening on prolonged stirring was less.

The use of the apparatus for making a magnesium/zirconium hardener alloy is described in Example 2.

EXAMPLE 2

18.6 kg of a mixture of halide salts containing a reducible zirconium halide was melted in a vessel and stirred using a stirrer as shown in the drawing, with the loop rotation reverse to the orbital rotation, and 1.6 kg of molten magnesium was added while stirring continued. Rotation speeds were as in Example 1. A rapid reaction took place to give a viscous mass containing salts and magnesium and zirconium metal. The reaction was complete within 1 minute.

The same procedure was carried out but with manual puddling instead of mechanical stirring. Puddling for 18 minutes was required to achieve complete reaction and was very strenuous in the later stages because of the high viscosity of the mixture.

When the reaction was complete the stirring with the loop was continued as before but the loop was gradually raised through the mixture. The salts in the mixture became separated from the metal alloy, were drawn to the surface by the rotating loop and could be removed by decantation without difficulty.

Removal of the salts by manual puddling was very laborious and required more than 1 hour of manipulation to achieve the same result.

It will be appreciated that the stirrer described above is cheap to manufacture, robust and has a paddle which may easily be interchanged for use with different molten materials or different shapes of vessel. It has been found that thorough mixing is achieved much more quickly in comparison with manual puddling. The speed and duration of rotation may easily be controlled so that identical stirring conditions for different melts may be achieved by unskilled operating personnel.

The generation of surface agitation is usually undesirable when handling oxidisable metals and alloys but if surface agitation is desired in particular instances the paddle may be of such dimensions that it extends above the surface, thus agitating the surface in addition to the body of the material in the vessel. Similarly a vortex may be formed if desired by arranging that the drive means has the same direction as that of the paddle about its axis.

We claim:

1. Apparatus for stirring a fluid mass comprising molten metal comprising a circular curved-bottomed vessel, a curved loop-shaped paddle to be immersed in the mass and means for rotating the paddle about a substantially center axis of the loop and simultaneously rotating said loop-shaped paddle in an orbit around a fixed axis causing said center axis of the loop to orbitally rotate about said fixed axis while passing said loop close to substantially the whole of the curved bottom of the vessel and traversing substantially all the fluid mass with said curved loop by the combined rotation about said center and fixed axis.

2. The apparatus of claim 1 further characterized by said means for rotating said paddle about a substantially center axis and simultaneously rotating said loop-shaped paddle in an orbit around a fixed axis including
a rotating element moving said fixed axis,
and a rod pivotly connecting said loop-shaped paddle to a point on said rotating arm displaced from said fixed axis.

3. Apparatus according to claim 1, in which the paddle is rotatable about an axis in both senses.

4. Apparatus according to claim 1, provided with means for raising and lowering the loop in the mass during rotation.

5. Apparatus according to claim 1, in which the loop is attached to an upwardly projecting rod connected to drive means to rotate the rod, the drive means itself being rotatable about said fixed axis.

6. Apparatus according to claim 5 in which the vessel is provided with a removable cover having a central hole through which the rod passes.

7. Apparatus according to claim 1, in which the loop has a width at least equal to half the width of the vessel.

* * * * *